US012107245B2

(12) United States Patent
Yu et al.

(10) Patent No.: US 12,107,245 B2
(45) Date of Patent: Oct. 1, 2024

(54) METHOD FOR RECYCLING LITHIUM IRON PHOSPHATE WASTE BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Haijun Yu, Guangdong (CN); Yinghao Xie, Guangdong (CN); Aixia Li, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/284,764

(22) PCT Filed: Sep. 28, 2022

(86) PCT No.: PCT/CN2022/122274
§ 371 (c)(1),
(2) Date: Sep. 28, 2023

(87) PCT Pub. No.: WO2023/245898
PCT Pub. Date: Dec. 28, 2023

(65) Prior Publication Data
US 2024/0274907 A1    Aug. 15, 2024

(30) Foreign Application Priority Data

Jun. 24, 2022   (CN) .......................... 202210737779.X

(51) Int. Cl.
*H01M 10/54*   (2006.01)
*C01G 49/00*   (2006.01)
*C22B 1/02*   (2006.01)
*C22B 7/00*   (2006.01)

(52) U.S. Cl.
CPC .......... *H01M 10/54* (2013.01); *C01G 49/009* (2013.01); *C22B 1/02* (2013.01); *C22B 7/007* (2013.01)

(58) Field of Classification Search
CPC ......... C22B 1/02; C22B 7/007; C01G 49/009; H01M 10/54
See application file for complete search history.

(56) References Cited

U.S. PATENT DOCUMENTS

2018/0212244 A1    7/2018   Jiao et al.

FOREIGN PATENT DOCUMENTS

| CN | 101567441 A | 10/2009 | |
|---|---|---|---|
| CN | 101630739 A | 1/2010 | |
| CN | 106384855 A | 2/2017 | |
| CN | 108470889 A | 8/2018 | |
| CN | 110277541 A | 9/2019 | |
| CN | 112174107 A | 1/2021 | |
| CN | 111224187 B * | 6/2021 | ........ H01M 10/0525 |
| CN | 113072052 A | 7/2021 | |
| CN | 113113575 A | 7/2021 | |
| CN | 113161524 A | 7/2021 | |
| CN | 114275754 A | 4/2022 | |
| CN | 115020855 A | 9/2022 | |
| CN | 115020855 B | 10/2023 | |
| JP | 6501011 B1 | 4/2019 | |
| KR | 2006-0054710 A | 5/2006 | |

OTHER PUBLICATIONS

Machine translation of CN 111224187 B (Year: 2021).*
Machine translation of CN 112174107 A (Year: 2021).*
International Search Report with the Written Opinion of the International Searching Authority issued by the China National Intellectual Property Administration for International Patent Application No. PCT/CN2022/122274, mailed on Jan. 19, 2023, with an English translation.
Notification to Grant Patent Right for Invention issued by the State Intellectual Property Office of the People's Republic of China for Chinese Patent Application No. 202210737779X, dated Aug. 11, 2023, with an English translation.

* cited by examiner

*Primary Examiner* — Matthew T Martin
*Assistant Examiner* — Unique Jenevieve Luna
(74) *Attorney, Agent, or Firm* — MYERS WOLIN, LLC

(57) ABSTRACT

The disclosure discloses a method for recycling a lithium iron phosphate waste battery, and belongs to the technical field of battery recycling. In the method for recycling the lithium iron phosphate waste battery according to the disclosure, it takes a cathode material of the waste lithium iron phosphate battery as a main body, uses a lithium source, a ferric source and a phosphorus source to supplement lithium to the cathode material for repairing, and meanwhile, rebuilds a new lithium iron phosphate coating layer containing a carbon layer cross-linked structure on a surface of the cathode material to realize regeneration of the lithium iron phosphate The disclosure also provides a regenerated lithium iron phosphate/C cathode material prepared by the recycling method.

12 Claims, No Drawings

METHOD FOR RECYCLING LITHIUM IRON PHOSPHATE WASTE BATTERY

CROSS-REFERENCE TO RELATED APPLICATION

This application is a national stage application under 35 U.S.C. § 371 of international application number PCT/CN2022/122274, filed Sep. 28, 2022, which claims priority to Chinese patent application No. 202210737779.X, filed Jun. 24, 2022. The contents of these applications are incorporated herein by reference in their entirety.

TECHNICAL FIELD

The present disclosure belongs to the technical field of battery recycling, and particularly relates to a method for recycling a lithium iron phosphate waste battery.

BACKGROUND

Lithium iron phosphate battery has the characteristics of high working voltage, high energy density, long cycle life and high safety performance. A cathode material of the lithium iron phosphate battery is lithium iron phosphate, and an anode of the lithium iron phosphate battery is generally matched with high-performance graphite, so that the lithium iron phosphate battery can be charged and discharged by back and forth de-intercalation of lithium ions. At present, the lithium iron phosphate battery has been widely used in fields such as power batteries, start-up energy sources and energy storage devices.

Generally speaking, the residual energy density of the waste lithium iron phosphate power battery can still reach 60 Wh/kg to 90 Wh/kg, and the recycling life of the waste lithium iron phosphate power battery can also reach 400 cycles to 1,000 cycles. The raw material cost of the waste lithium iron phosphate is generally less than 10,000 RMB/ton. Moreover, the lithium iron phosphate battery contains more harmful substances, which is easy to cause environmental pollution. Therefore, the cost performance and environmental protection of the industry of effectively recycling the lithium iron phosphate waste battery are very high. However, in the prior art, only the cathode material in the lithium iron phosphate battery is recycled, and the cathode material mainly recycled and further regenerated by a wet method. This method introduces many kinds of production reagents and high-demand process steps, and the recycling efficiency is not high, which leads to the increase of the cost of the final recycled product. At the same time, the performance of the recycled product is not ideal, the performance between batches cannot be matched, which makes the available fields of the recycled product are few.

SUMMARY

Based on the shortcomings of the prior art, the object of the present disclosure is to provide a method for recycling a lithium iron phosphate waste battery. By using the method, a cathode material and an anode material in the waste lithium iron phosphate battery can be simultaneously recycled, and a high-capacity regenerated lithium iron phosphate/C cathode material can be prepared with the recycled cathode and anode materials.

To achieve the above object, the technical solutions used by the present disclosure are as follows:

A method for recycling a lithium iron phosphate waste battery comprises the following steps of:

(1) preprocessing a cathode material: subjecting a cathode plate of the lithium iron phosphate waste battery to washing, impurity removing by heating, and sieving to obtain a lithium iron phosphate powder A;

(2) preprocessing an anode material: after washing and drying an anode graphite plate of the lithium iron phosphate waste battery, adding the obtained graphite powder into a mixed acid solution, stirring and reacting for 5 hours to 10 hours to obtain a mixed solution B; wherein, the mixed acid solution is a mixed solution of hydrochloric acid and nitric acid, and a ratio of a mass of the graphite powder to a volume of the mixed acid solution is (100 to 300) g:1 L; and then, adding an oxidant into the mixed solution B, and heating until the reaction is complete, then adding a reductant for a reduction reaction, and obtaining a modified graphite powder C after heating and heat preservation;

(3) preparing a precursor: dispersing the lithium iron phosphate powder A and the modified graphite powder C in deionized water, introducing a soluble ferric salt, PEG, a soluble phosphate and gelatin, uniformly mixing, then adding a lithium salt, and drying to obtain a precursor gel D; wherein a mass ratio of the lithium iron phosphate powder A to the modified graphite powder C and the gelatin is 1:(0.1 to 0.5):(0.01 to 0.5); and (4) preparing a regenerated lithium iron phosphate/C cathode material: calcining the precursor gel D at 600° C. to 800° C. in an inert atmosphere for 5 hours to 10 hours, washing and drying to obtain the regenerated lithium iron phosphate/C cathode material.

In the method for recycling the lithium iron phosphate waste battery according to the present disclosure, it takes the waste lithium iron phosphate contained in the cathode plate as a main body, uses a lithium source, a ferric source and a phosphorus source to supplement lithium to the cathode material for repairing, and meanwhile, rebuilds a new lithium iron phosphate coating layer containing a carbon layer cross-linked structure on a surface of the cathode material to realize regeneration of the lithium iron phosphate. The built coating layer can effectively accelerate the rapid transmission of lithium ions, and meanwhile, can alleviate structural damage of the regenerated lithium iron phosphate in the process of charging and discharging to a certain extent, so that the regenerated material has charge and discharge capacity and stability comparable to that of a newly-made lithium iron phosphate cathode material. Secondly, the graphite material in the anode plate is used as a matrix, and the graphite material has more tiny defects because the graphite material undergoes multiple lithium ion interpenetration during the process of charging the battery. After the chemical oxidation-reduction method is used to further process and treat the graphite material, the microscopic carbon layer generates obvious expansion and differentiation phenomena, and the obtained modified graphite material has an excellent porous cross-linked structure. The gelatin is used as a cross-linking agent to fully combine the modified graphite material and the raw materials lithium iron phosphate of each coating layer (the gelatin can also form a cross-linked carbon network structure after carbonization), and a specific surfactant PEG (polyethylene glycol) is matched, so that the precursor material is in a relatively dispersed gel state before calcination, and may not precipitate to the bottom, the finally prepared regenerated material has high dispersibility and uniform shape, and the contained lithium iron phosphate active material cannot agglomerate or cannot be supplemented with lithium, and the electrochemical performance is far better than that of a doped lithium iron phosphate material prepared by adopting other carbon sources. Bu using the method, the cathode material and the anode material in the waste lithium iron phosphate battery can be simultaneously used, so that the raw material utilization rate is high, the cost performance is high, and the obtained regenerated material has excellent performance, which is very suitable for recycling large quantities of waste lithium iron phosphate batteries. In addition, the content of the carbon material in the recycled material is relatively low, so the prepared regenerated lithium iron phosphate/C cathode material has high unit capacity and high application prospect.

Preferably, in the step (1), the cathode plate is washed with an organic solvent.

Preferably, the organic solvent is at least one selected from the group consisting of ethanol, methanol and NMP.

Preferably, in the step (1), a condition of the impurity removing by heating is: heating the washed cathode plate to 100° C. to 200° C. in an inert atmosphere and keep the temperature for 1 hour to 2 hours.

In the process of recycling, the lithium iron phosphate cathode material in the waste battery not only contains impurities from inside the battery, such as electrolyte, electrode plate binder, but also introduces other types of substances, such as separating agent, detergent, etc. Therefore, it is necessary to wash with an organic solvent and calcine at low temperature to remove the impurities.

Preferably, in the step (2), a concentration of the hydrochloric acid in the mixed solution is 6 mol/L to 8 mol/L, and a concentration of the nitric acid is 1 mol/L to 2 mol/L.

Unlike conventional graphite or the reduced graphene prepared by simple HUMMER method, an interlayer spacing of anode graphite layers in the lithium iron phosphate battery after tens of thousands of lithium deintercalations is usually large. The solvent oxidation by the mixed solution of the hydrochloric acid and the nitric acid with a high concentration can further increase the interlayer spacing between the graphite layers, so that the lithium iron phosphate can be effectively inserted between the layers to form a composite material with a three-dimensional structure subsequently, and organic polymer impurities contained in the graphite can also be effectively removed. Meanwhile, the inventor found that when an oxidation degree of the solvent is too large, the graphite layer will be seriously gelatinized, which will reduce a modification degree of the subsequent oxidation-reduction method. Moreover, it is not conducive to the full dispersion of the lithium iron phosphate in the subsequent process of preparing the precursor by mixing with the gelatin, and the final product performance is not ideal.

Preferably, in the step (2), the oxidant is at least one selected from the group consisting of sodium hypochlorite and potassium hypochlorite, and the reductant is hydrogen peroxide.

Preferably, in the step (2), a condition of the heating and heat preservation is: heating the reactant to 450° C. to 600° C. in an inert atmosphere and keep the temperature for 1 hour to 3 hours.

Preferably, in the step (3), the soluble ferric salt comprises at least one selected from the group consisting of ferric sulfate, ferric nitrate and ferric chloride.

Preferably, in the step (3), the soluble phosphate is ammonium dihydrogen phosphate.

Preferably, in the step (3), the lithium salt is at least one selected from the group consisting of lithium carbonate, lithium oxalate, lithium acetate and lithium bromide.

Preferably, a molar ratio of $Fe^{3+}$ in the soluble ferric salt, $PO_4^{3-}$ in the soluble phosphate and $Li^+$ in the lithium salt is (0.8 to 1):(0.8 to 1):(1 to 1.2).

More preferably, a molar ratio of $Fe^{3+}$ in the soluble ferric salt, $PO_4^{3-}$ in the soluble phosphate and $Li^+$ in the lithium salt is 1:1:1.2.

More preferably, a molar ratio of $Li^+$ in the lithium salt to the lithium iron phosphate powder A is (0.05 to 0.1): 1.

In the process of the present disclosure, on the basis of the original lithium iron phosphate powder A, it is necessary to regenerate a new lithium iron phosphate coating composite layer on a surface layer of the lithium iron phosphate powder A, and meanwhile, it is also necessary to properly supplement lithium for some of the original lithium iron phosphate powder A which lacks lithium. It is confirmed by the inventor through experiment that a lithium supplement effect of the lithium iron phosphate in the final product is the best when the raw materials are mixed with the above ratio, and the new and old lithium iron phosphate active ingredients have the best performance.

Another object of the present disclosure is to provide a regenerated lithium iron phosphate/C cathode material prepared by the method for recycling the lithium iron phosphate waste battery.

According to the recycling method of the present disclosure, the cathode material and the carbon anode material in the waste battery are reprocessed at the same time, and the prepared regenerated lithium iron phosphate/C cathode material has excellent cycle stability and high charge and discharge capacity through a proper coating process. The lithium ion half battery prepared by using the cathode material has a specific discharge capacity of 140 mAh/g after 200 cycles at a multiplying factor of 0.5 C, and has a high coulomb efficiency, which can be completely comparable to a newly-made lithium iron phosphate cathode material.

The present disclosure has the below beneficial effects. The present disclosure provides the method for recycling the lithium iron phosphate waste battery, which takes the lithium iron phosphate contained in the cathode plate of the waste lithium iron phosphate battery as a main body, uses a lithium source, a ferric source and a phosphorus source to supplement lithium to the cathode material for repairing, and meanwhile, rebuilds a new lithium iron phosphate coating layer containing a carbon layer cross-linked structure on a surface of the cathode material to realize regeneration of the lithium iron phosphate. The built coating layer comprises the graphite material in the waste lithium iron phosphate anode plate, and gelatin and PEG are matched to be used as precursors to prepare the modified graphite material, so that the modified graphite material has an excellent porous cross-linking structure, which enables the finally prepared regenerated material to have high dispersibility and uniform shape. The contained lithium iron phosphate active material cannot agglomerate or cannot be supplemented with lithium, and the electrochemical performance is far better than that of a doped lithium iron phosphate material prepared by adopting other carbon sources. In the method, the cathode material and the anode material in the waste lithium iron phosphate battery are used simultaneously, so that the raw material utilization rate is high, the cost performance is high, and the obtained regenerated material has excellent performance, which is very suitable for recycling large quantities of waste lithium iron phosphate batteries. In addition, the content of the carbon material in the recycled material is relatively low, so the prepared regenerated lithium iron phosphate/C cathode material has high unit capacity and high application prospect. The present disclosure also provides the regenerated lithium iron phosphate/C cathode material prepared by the recycling method.

DETAILED DESCRIPTION

In order to better explain the objects, technical solutions and advantages of the present disclosure, the present disclosure will be further explained with reference to specific embodiments and comparative examples, with the aim of understanding the content of the present disclosure in detail, but not limiting the present disclosure. All other embodiments obtained by those having ordinary skills in the art without paying creative work belong to the protection scope of the present disclosure. Unless otherwise specified, the experimental reagents, raw materials and instruments designed in the embodiments and comparative examples of the present disclosure are all commonly used common reagents, raw materials and instruments, especially the used lithium iron phosphate waste battery. The cathode material and the anode graphite material in the battery are all conventionally purchased raw materials, and the self-made recycled raw materials are also be used.

Example 1

A method for recycling a lithium iron phosphate waste battery according to an example of the present disclosure comprised the following steps of:
(1) preprocessing a cathode material: washing a cathode plate of the lithium iron phosphate waste battery by using a mixed solution of ethanol and NMP (volume ratio of 1:1), heating to 150° C. in an argon atmosphere in a sealed manner, preserving heat for 2 hours, removing impurities, and sieving to obtain a lithium iron phosphate powder A;
(2) preprocessing an anode material: after washing an anode graphite plate of the lithium iron phosphate waste battery with ethanol and drying, adding the obtained graphite powder into a mixed acid solution, stirring and reacting for 8 hours to obtain a mixed solution B; wherein, the mixed acid solution was a mixed solution of hydrochloric acid (6 mol/L) and nitric acid (2 mol/L), and a ratio of a mass of the graphite powder to a volume of the mixed acid solution was 200 g:1 L; and
then, adding an oxidant sodium hypochlorite into the mixed solution B, and heating until the reaction is complete, then adding a reductant hydrogen peroxide for a reduction reaction (a mass ratio of the graphite powder to the oxidant to the hydrogen peroxide was 1:0.5:1), and obtaining a modified graphite powder C after heating and heat preservation for 2 hours at 500° C. under an argon atmosphere;
(3) preparing a precursor: dispersing the lithium iron phosphate powder A and the modified graphite powder C in deionized water, introducing a soluble ferric salt ferric chloride, PEG, a soluble phosphate ammonium dihydrogen phosphate and gelatin, uniformly mixing, then adding a lithium salt lithium carbonate, and drying to obtain a precursor gel D; wherein a mass ratio of the lithium iron phosphate powder A to the modified graphite powder C and the gelatin was 1:0.2:0.04; a molar ratio of $Li^+$ in the lithium salt to the lithium iron phosphate powder A was 0.1:1; and a molar ratio of $Fe^{3+}$ in the soluble ferric salt, $PO_4^{3-}$ in the soluble phosphate and $Li^+$ in the lithium salt was 1:1.1:1.2; and
(4) preparing a regenerated lithium iron phosphate/C cathode material: calcining the precursor gel D at 700° C. in an argon atmosphere for 8 hours, washing and drying to obtain the regenerated lithium iron phosphate/C cathode material.

Example 2

A method for recycling a lithium iron phosphate waste battery according to an example of the present disclosure comprised the following steps of:
(1) preprocessing a cathode material: washing a cathode plate of the lithium iron phosphate waste battery by using a mixed solution of ethanol and NMP (volume ratio of 1:1), heating to 200° C. in an argon atmosphere in a sealed manner, preserving heat for 1.5 hours, removing impurities, and sieving to obtain a lithium iron phosphate powder A;
(2) preprocessing an anode material: after washing an anode graphite plate of the lithium iron phosphate waste battery with ethanol and drying, adding the obtained graphite powder into a mixed acid solution, stirring and reacting for 8 hours to obtain a mixed solution B; wherein, the mixed acid solution was a mixed solution of hydrochloric acid (6 mol/L) and nitric acid (2 mol/L), and a ratio of a mass of the graphite powder to a volume of the mixed acid solution was 200 g:1 L; and
then, adding an oxidant potassium hypochlorite into the mixed solution B, and heating until the reaction is complete, then adding a reductant hydrogen peroxide for a reduction reaction (a mass ratio of the graphite powder to the oxidant to the hydrogen peroxide was 1:0.5:1), and obtaining a modified graphite powder C after heating and heat preservation for 2 hours at 500° C. under an argon atmosphere;
(3) preparing a precursor: dispersing the lithium iron phosphate powder A and the modified graphite powder C in deionized water, introducing a soluble ferric salt ferric nitrate, PEG, a soluble phosphate ammonium dihydrogen phosphate and gelatin, uniformly mixing, then adding a lithium salt lithium acetate, and drying to obtain a precursor gel D; wherein a mass ratio of the lithium iron phosphate powder A to the modified graphite powder C and the gelatin was 1:0.2:0.04; a molar ratio of $Li^+$ in the lithium salt to the lithium iron phosphate powder A was 0.1:1; and a molar ratio of $Fe^{3+}$ in the soluble ferric salt, $PO_4^{3-}$ in the soluble phosphate and $Li^+$ in the lithium salt was 1:1.1:1.2; and
(4) preparing a regenerated lithium iron phosphate/C cathode material: calcining the precursor gel D at 650° C. in an argon atmosphere for 10 hours, washing and drying to obtain the regenerated lithium iron phosphate/C cathode material.

Example 3

A method for recycling a lithium iron phosphate waste battery according to an example of the present disclosure comprised the following steps of:
(1) preprocessing a cathode material: washing a cathode plate of the lithium iron phosphate waste battery by using a mixed solution of ethanol and NMP (volume ratio of 1:1), heating to 150° C. in an argon atmosphere in a sealed manner, preserving heat for 2 hours, removing impurities, and sieving to obtain a lithium iron phosphate powder A;

(2) preprocessing an anode material: after washing an anode graphite plate of the lithium iron phosphate waste battery with ethanol and drying, adding the obtained graphite powder into a mixed acid solution, stirring and reacting for 8 hours to obtain a mixed solution B; wherein, the mixed acid solution was a mixed solution of hydrochloric acid (8 mol/L) and nitric acid (1 mol/L), and a ratio of a mass of the graphite powder to a volume of the mixed acid solution was 300 g:1 L; and then, adding an oxidant sodium hypochlorite into the mixed solution B, and heating until the reaction is complete, then adding a reductant hydrogen peroxide for a reduction reaction (a mass ratio of the graphite powder to the oxidant to the hydrogen peroxide was 1:0.5:1), and obtaining a modified graphite powder C after heating and heat preservation for 2 hours at 500° C. under an argon atmosphere;

(3) preparing a precursor: dispersing the lithium iron phosphate powder A and the modified graphite powder C in deionized water, introducing a soluble ferric salt ferric nitrate, PEG, a soluble phosphate ammonium dihydrogen phosphate and gelatin, uniformly mixing, then adding a lithium salt lithium carbonate, and drying to obtain a precursor gel D; wherein a mass ratio of the lithium iron phosphate powder A to the modified graphite powder C and the gelatin was 1:0.2:0.04; a molar ratio of $Li^+$ in the lithium salt to the lithium iron phosphate powder A was 0.1:1; and a molar ratio of $Fe^{3+}$ in the soluble ferric salt, $PO_4^{3-}$ in the soluble phosphate and $Li^+$ in the lithium salt was 1:1.1:1.2; and (4) preparing a regenerated lithium iron phosphate/C cathode material: calcining the precursor gel D at 750° C. in an argon atmosphere for 6 hours, washing and drying to obtain the regenerated lithium iron phosphate/C cathode material.

Example 4

The only difference between this comparative example and Example 1 was that a mass ratio of the lithium iron phosphate powder A to the modified graphite powder C and the gelatin in the step (3) was 1:0.5:0.05.

Example 5

The only difference between this comparative example and Example 1 was that a mass ratio of the lithium iron phosphate powder A to the modified graphite powder C and the gelatin in the step (3) was 1:0.1:0.01.

Comparative Example 1

The only difference between this comparative example and Example 1 was that the soluble ferric salt, the soluble phosphate and the lithium salt were not introduced in the step (3).

Comparative Example 2

The only difference between this comparative example and Example 1 was that the modified graphite powder C in the step (3) was replaced by commercially available graphite.

Comparative Example 3

The only difference between this comparative example and Example 1 was that the modified graphite powder C in the step (3) was replaced by self-prepared graphene by using HUMMER method.

The specific steps of HUMMER method were as follows: adding 5 g of graphite powder, 1 g of sodium nitrate and 6 g of potassium permanganate into an appropriate amount (about 200 mL) of a mixed solution of high-concentration concentrated sulfuric acid solution and phosphoric acid solution at 0° C. in an ice bath, stirring and mixing, adding 6 g of potassium permanganate again, heating to a normal temperature, reacting for 12 hours, adding an appropriate amount of hydrogen peroxide for completely reaction, drying the resulted product to be viscous, dispersing a part of the viscous product in water, adding an appropriate amount of hydrazine hydrate under an ultrasonic condition, reacting for 24 hours completely, washing the obtained product with ethanol and water, and drying to obtain the self-prepared graphene.

Comparative Example 4

The only difference between this comparative example and Example 1 was that in the step (2), the graphite powder was added into the mixed acid solution and stirred for reaction for 15 hours to obtain the mixed solution B; and a ratio of a mass of the graphite powder to a volume of the mixed acid solution was 50 g:1 L.

Comparative Example 5

The only difference between this comparative example and Example 1 was that the gelatin in the step (3) was replaced by glucose.

Comparative Example 6

The only difference between this comparative example and Example 1 was that the gelatin in the step (3) was replaced by sucrose.

Comparative Example 7

The only difference between this comparative example and Example 1 was that the PEG in the step (3) was replaced by CTAB (cetyltrimethylammonium bromide).

Comparative Example 8

The only difference between this comparative example and Example 1 was that a mass ratio of the lithium iron phosphate powder A to the modified graphite powder C and the gelatin in the step (3) was 1:0.2:0.005.

Comparative Example 9

The only difference between this comparative example and Example 1 was that a mass ratio of the lithium iron phosphate powder A to the modified graphite powder C and the gelatin in the step (3) was 1:0.1:0.1.

Effect Example 1

In order to verify the performances of the regenerated lithium iron phosphate/C cathode materials prepared by the method for recycling the lithium iron phosphate waste battery according to the present disclosure, the products of each example and comparative example were prepared into lithium ion half batteries for performance test, wherein the lithium-ion half batteries were assembled by using metal lithium plates as anode electrodes and commercial electrolyte. The test was carried out at a working voltage of 2.5 V to 4.3 V. Each group of assembled batteries was subjected to long cycle tests for 200 cycles at a multiplying factor of 0.5 C, and the results were shown in Table 1.

TABLE 1

| Tested performance | Initial specific discharge capacity at (mAh/g) | Specific discharge capacity after 200 cycles (mAh/g) |
| --- | --- | --- |
| Example 1 | 152.5 | 142.7 |
| Example 2 | 150.1 | 139 |
| Example 3 | 155.6 | 140.5 |
| Example 4 | 143 | 136.1 |
| Example 5 | 158.4 | 137 |
| Comparative Example 1 | 121.5 | 98.6 |
| Comparative Example 2 | 154.7 | 126 |
| Comparative Example 3 | 153.9 | 131 |
| Comparative Example 4 | 145.3 | 118.4 |
| Comparative Example 5 | 148 | 115.9 |
| Comparative Example 6 | 150.5 | 106 |
| Comparative Example 7 | 146.7 | 121.8 |
| Comparative Example 8 | 156 | 125.5 |
| Comparative Example 9 | 141.2 | 113.7 |

As can be seen from Table 1, the initial capacity of all the regenerated lithium iron phosphate/C cathode material prepared by the method for recycling the lithium iron phosphate waste battery according to the present disclosure is high, and the specific discharge capacity is still maintained more than 135 mAh/g after 200 cycles at a low multiplying factor of 0.5 C. After calculation, the capacity retention rates of Examples 1 to 5 are 93.57%, 92.6%, 90.29%, 95.17% and 86.48% respectively. In contrast, the long-cycle specific discharge capacities or capacity retention rates of the products of the comparative examples are difficult to reach the level of the examples, and the products of Comparative Example 1 prepared without building a new lithium iron phosphate layer and lithium supplementation of the original lithium iron phosphate layer have either low initial specific discharge capacity or capacity retention rate. However, in Comparative Examples 2 and 3, the commercial graphite or graphene which are common in the prior art are used as the graphite layers in the process, since the interlayer spacing between the commercial graphite and graphene is small, it is difficult to achieve an ideal lithium iron phosphate loading effect, and the cycle stability is not as good as that of the product of Example 1. The degree of acidification and oxidation of the graphite powder in the product of Comparative Example 4 are too high, so an interlayer structure of the graphite powder is destroyed to a certain extent. The original lithium iron phosphate particles from the waste battery are difficult to uniformly load on the surface of the graphite layer, and the newly generated lithium iron phosphate cannot be uniformly dispersed, so the cycle stability of the product is not high. An amorphous carbon source and a surfactant used in the process methods of Comparative Examples 5 to 7 are not the preferred types of the present disclosure. Compared with the gelatin, the soluble carbon source is difficult to form a good gel dispersion system in the precursor preparation process, and the product appears obvious unevenness in the subsequent sintering process. Even if the gelatin is used as the amorphous carbon source matching the graphite layer, selecting other kinds of surfactants will also lead to the difficulty in reaching the ideal degree of uniformity of each component, so the specific discharge capacity and cycle stability of the product are not high. The ratio of the graphite powder to the amorphous carbon in Comparative Examples 8 and 9 is inappropriate, and the specific discharge capacities or cycle stabilities of the products are not as good as those of Examples 1, 4 and 5.

Effect Example 2

The same method as that in Effect Example 1 was used. When testing the electrochemical performance, each product was first cycled for 20 cycles at a multiplying factor rate of 0.5 C, then cycled for 200 cycles at a multiplying factor of IC, and finally lowered to a multiplying factor of 0.5 C again. The test results were shown in Table 2.

TABLE 2

| Tested performance | Initial specific discharge capacity at 0.5 C (mAh/g) | Specific discharge capacity at 1 C (mAh/g) | Specific discharge capacity after returning back to 0.5 C (mAh/g) |
| --- | --- | --- | --- |
| Example 1 | 150.6 | 132.5 | 139.5 |
| Example 2 | 151.3 | 126.1 | 137 |
| Example 3 | 157.2 | 128 | 135.8 |
| Example 4 | 139.5 | 118.5 | 129.5 |
| Example 5 | 152.6 | 119.6 | 126 |
| Comparative Example 1 | 125.4 | 76.8 | 92.2 |
| Comparative Example 2 | 150 | 115 | 124 |
| Comparative Example 3 | 152.7 | 120.7 | 125.7 |
| Comparative Example 4 | 148.1 | 108.5 | 120.5 |
| Comparative Example 5 | 145.2 | 105.2 | 116.7 |
| Comparative Example 6 | 151 | 96.5 | 109 |
| Comparative Example 7 | 148.9 | 115.9 | 122.6 |
| Comparative Example 8 | 152.5 | 104.6 | 119.2 |
| Comparative Example 9 | 145.7 | 98.5 | 108 |

It can be seen from Table 2 that the regenerated lithium iron phosphate/C cathode material prepared by the method for recycling the lithium iron phosphate waste battery according to the present disclosure also has an ideal rate performance, and can still maintain a specific discharge capacity more than 115 mAh/g at a multiplying factor of 1 C. At the same time, the capacity of the product returning back to multiplying factor cycle after high multiplying factor cycle is equivalent to that of low multiplying factor cycle in Table 1, indicating that the product has high structural stability and will not be destroyed by high multiplying factor cycle.

Finally, it should be noted that the embodiments above are merely used to illustrate the technical solutions of the present disclosure, but are not intended to limit the protection scope of the present disclosure. Although the present disclosure has been described in detail with reference to the preferred embodiments, those skilled in the art should understand that the technical solutions of the present disclosure can be modified or equivalently replaced without departing from the essence and scope of the technical solutions of the present disclosure.

The invention claimed is:

1. A method for recycling lithium iron phosphate waste batteries, comprising the following steps of:
    (1) preprocessing a cathode material: subjecting a cathode plate of the lithium iron phosphate waste batteries to washing, removal of impurity by heating, and sieving to obtain a lithium iron phosphate powder A;
    (2) preprocessing an anode material: after washing and drying an anode graphite plate of the lithium iron phosphate waste batteries, adding an obtained graphite powder into a mixed acid solution, stirring and reacting for 5 hours to 10 hours to obtain a mixed solution B; wherein, the mixed acid solution is a mixed solution of hydrochloric acid and nitric acid, a ratio of a mass of the graphite powder to a volume of the mixed acid solution is (100 to 300) g:1 L, and in the mixed solution, a concentration of the hydrochloric acid is 6 mol/L to 8 mol/L, and a concentration of the nitric acid is 1 mol/L, to 2 mol/L; and
    then, adding an oxidant into the mixed solution B, and heating until the reaction is complete, then adding a reductant for a reduction reaction, and obtaining a modified graphite powder C after heating and heat preservation; wherein, the oxidant is at least one selected from the group consisting of sodium hypochlorite and potassium hypochlorite, the reductant is hydrogen peroxide, and the heating and heat preservation is heating to a temperature of 450° C. to 600° C. in an inert atmosphere and keeping the temperature for 1 hour to 3 hours;
    (3) preparing a precursor: dispersing the lithium iron phosphate powder A and the modified graphite powder C in deionized water, introducing a soluble ferric salt, PEG, a soluble phosphate and gelatin, uniformly mixing, then adding a lithium salt, and drying to obtain a precursor gel D; wherein a mass ratio of the lithium iron phosphate powder A, the modified graphite powder C and the gelatin is 1:(0.1 to 0.5):(0.01 to 0.5); and
    (4) preparing a regenerated lithium iron phosphate/C cathode material: calcining the precursor gel D at 600° C. to 800° C. in an inert atmosphere for 5 hours to 10 hours, washing and drying to obtain the regenerated lithium iron phosphate/C cathode material.

2. The method for recycling the lithium iron phosphate waste batteries according to claim 1, wherein in the step (1), the cathode plate is washed with an organic solvent,
    wherein the organic solvent is at least one selected from the group consisting of ethanol, methanol and NMP.

3. The method for recycling the lithium iron phosphate waste batteries according to claim 1, wherein in the step (1), the removal of impurity by heating involves heating the cathode plate after being washed to a temperature of 100° C. to 200° C. in an inert atmosphere and keeping the temperature for 1 hour to 2 hours.

4. The method for recycling the lithium iron phosphate waste batteries according to claim 1, wherein in the step (3), the soluble ferric salt comprises at least one selected from the group consisting of ferric sulfate, ferric nitrate and ferric chloride; the soluble phosphate is ammonium dihydrogen phosphate; and the lithium salt is at least one selected from the group consisting of lithium carbonate, lithium oxalate, lithium acetate and lithium bromide.

5. The method for recycling the lithium iron phosphate waste batteries according to claim 4, wherein a molar ratio of $Fe^{3+}$ in the soluble ferric salt, $PO_4^{3-}$ in the soluble phosphate and $Li^+$ in the lithium salt is (0.8 to 1):(0.8 to 1):(1 to 1.2).

6. The method for recycling the lithium iron phosphate waste batteries according to claim 5, wherein a molar ratio of $Li^+$ in the lithium salt to the lithium iron phosphate powder A is (0.05 to 0.1):1.

7. A regenerated lithium iron phosphate/C cathode material prepared by the method for recycling the lithium iron phosphate waste batteries according to claim 1.

8. A regenerated lithium iron phosphate/C cathode material prepared by the method for recycling the lithium iron phosphate waste batteries according to claim 2.

9. A regenerated lithium iron phosphate/C cathode material prepared by the method for recycling the lithium iron phosphate waste batteries according to claim 3.

10. A regenerated lithium iron phosphate/C cathode material prepared by the method for recycling the lithium iron phosphate waste batteries according to claim 7.

11. A regenerated lithium iron phosphate/C cathode material prepared by the method for recycling the lithium iron phosphate waste batteries according to claim 5.

12. A regenerated lithium iron phosphate/C cathode material prepared by
    the method for recycling the lithium iron phosphate waste batteries according to claim 6.

* * * * *